E. W. POHLIG.
FENDER FOR VEHICLES.
APPLICATION FILED MAY 26, 1919.

1,340,835.

Patented May 18, 1920.
2 SHEETS—SHEET 1.

Inventor:
Edgar W. Pohlig,
By his Attorney Wm H Reid.

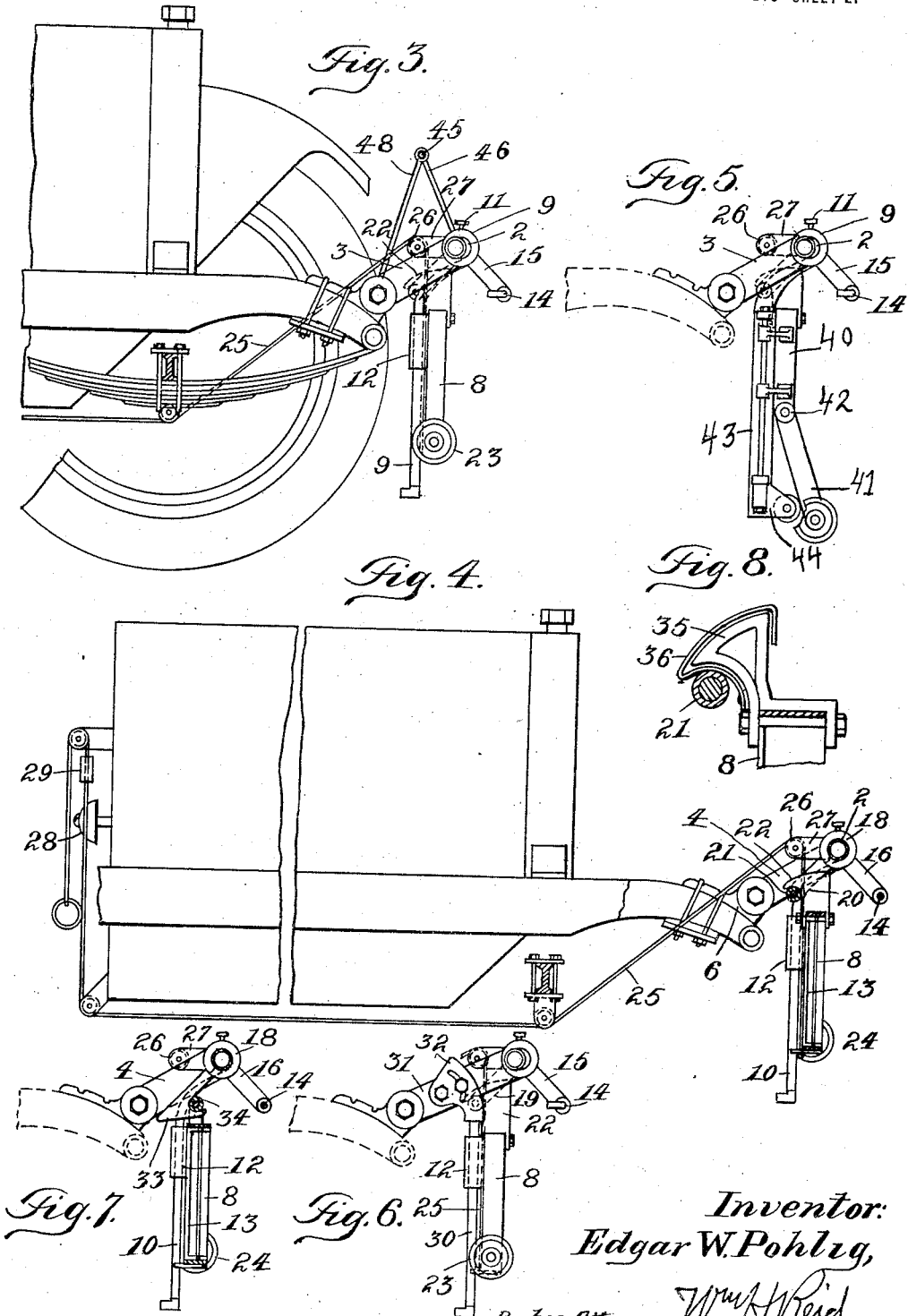

UNITED STATES PATENT OFFICE.

EDGAR W. POHLIG, OF NEW YORK, N. Y.

FENDER FOR VEHICLES.

1,340,835.  Specification of Letters Patent.  Patented May 18, 1920.

Application filed May 26, 1919. Serial No. 299,918.

*To all whom it may concern:*

Be it known that I, EDGAR W. POHLIG, a citizen of the United States, residing at New York city, in the county and State of New York, have invented certain new and useful Improvements in Fenders for Vehicles, of which the following is a specification.

This invention has for its object to provide a fender adapted to be carried by vehicles of various kinds, particularly motor vehicles, in which a member in the form of a bumper is provided with a fender arranged to move up and down, and a contact member is provided normally located in front of the bumper and of the fender, and connected with the fender whereby on engagement with an obstruction the contact member will move to the rear and permit the fender to drop.

A further object of the invention is to provide such an arrangement whereby rearward movement of the contact member by the obstruction will result in the obstruction engaging the bumper.

Another object of the invention is to provide means whereby the raising of the fender that has been dropped will result in its reëngagement and connection with the contact means.

Another object is to provide in a fender of this character, a structure whereby the lower portion of the fender will project forward when dropped.

Another object of the invention is to provide an improved form of trip member or hook, that has a resilient engagement with its supporting and releasing member.

In the accompanying drawings showing embodiments of my invention, Figure 1 is a front elevation of a motor vehicle with the device attached thereto.

Fig. 3 is a side elevation.

Fig. 4 is a vertical section on the line 4—4 indicated in Fig. 2.

Fig. 5 shows a modified form of fender.

Fig. 6 shows a modified form of suspension for the fender.

Fig. 7 shows a modification of the trip device.

Fig. 8 shows a modified form of hook.

Figure 1:
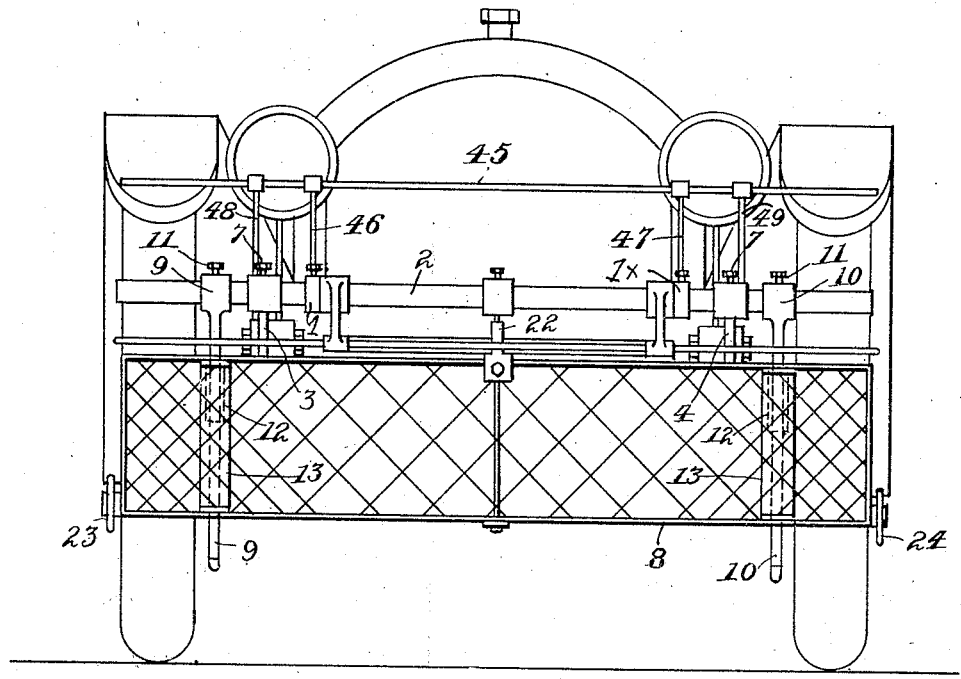

This invention comprises essentially a bumper with means for attachment to the frame of a motor vehicle; a fender having means for vertical movement below the bumper; a contact bar supported to swing back and forth and located in front of the bumper; and a trip device connected between the fender and the contact member that serves to hold the fender normally raised, to be tripped by rearward movement of the contact member on striking an obstruction, whereby the fender is dropped.

In the construction shown, I provide a bumper 2 that is supported by arms 3 and 4, that can shift along the bumper 2 for adjustment, to be bolted to the frame members 5 and 6, and which obviously will permit the arms to project forward at the desired angle to properly position the fender 8. These arms have bolts 7 at their sleeve ends, that may engage notches or holes in the bumper 2 for adjustment for different widths of frame.

I provide a fender 8 of any desired form, such as a frame having laced members. This frame is guided for vertical movement by means of hangers 9 and 10 that are bent at their upper ends to surround the bumper 2. They are shown provided with bolts 11 that engage the bumper to permit them to be swung back and forth until brought to the proper vertical position. These guide bars are engaged by sleeves 12 carried by bars 13 on the fender frame.

Figure 2:
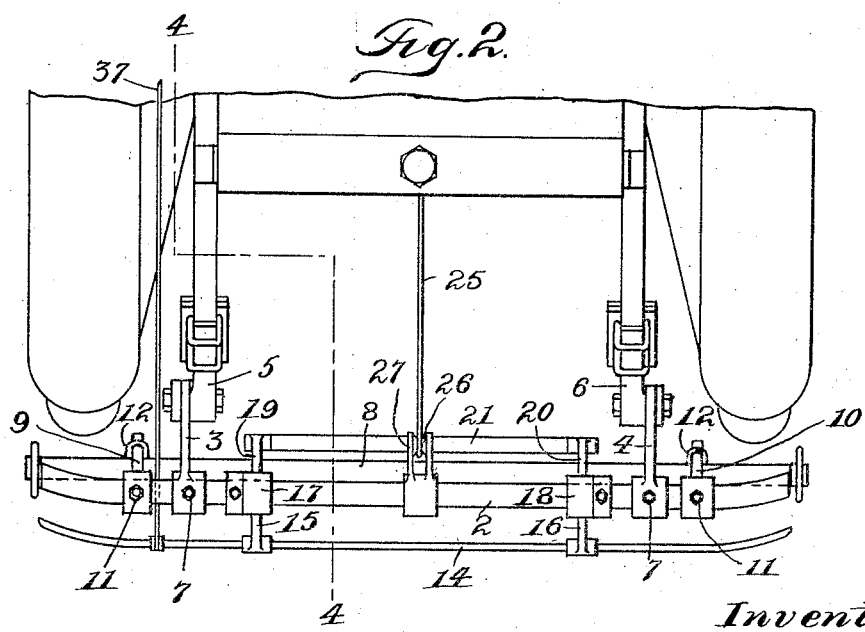
Fig. 2 is a plan of the same.

A contact bar 14 is carried by arms 15, 16, projecting from sleeves 17, 18, that swing on the bumper 2, see Fig. 2. Arms 19 and 20 project rearward from the sleeves 17 and 18 at a downward angle, see Fig. 4, which arms carry a release bar 21 that may be provided with a sleeve or roller. Between the fender 8 and the contact member as set forth, I provide a trip arrangement in the form of a hook on one member that engages a release bar on the other member. As shown, except in Fig. 7, a hook 22 is carried by the fender, and normally engages the release bar 21, see Fig. 4. In this position the fender is supported elevated, and if an obstruction engages the contact bar 14, it will move rearward and downward, that will swing the release bar rearward and also upward. This will move the release bar out of engagement with the hook, and the fender will drop by gravity. It will be observed that this will take place before the contact bar moves back sufficiently to permit the object to engage the fender 8; but it will be also understood that this will permit the object to engage the bumper, that will prevent the object approaching any nearer to the vehicle. But this will insure the dropping of the fender before the obstruction strikes the bumper. This dropping of the fender will prevent an object such as a person from being carried beneath the car, and especially beneath the wheels of the car. The fender is shown provided with small wheels 23, 24, at the lower part, that run on the ground when the fender is dropped.

To return the fender to normal position it is simply raised, and the upper inclined edge of the hook 22 will strike the release bar and move it rearward and upward, that is permitted by the free swing of the contact and release bars. As soon as the release bar passes beyond the end of the hook, it will fall and assume the position shown in Fig. 4. To permit the raising of the fender when dropped, from the vehicle, I provide a flexible member such as a cord 25, that passes around a guide pulley 26 supported by arm 27 on the bumper, and then below the motor to the body of the car. The operator will simply pull this cord and raise the fender, that will automatically reëngage the release bar, as set forth.

Since the fender may not be visible from the car, to show that it may have dropped, I provide a suitable indicating or signal device. As shown a bell 28 is arranged on the car, to be engaged by a block 29 on the flexible member, that will ring the bell when the fender is dropped.

If preferred the guide bars for the fender may be supported by the arms 3 and 4 that carry the bumper. In Fig. 6 the bars 30 are secured to the arms 31 that carry the bumper, by means of bolts passing through apertures and slots in a plate 32 on each bar 30. This will permit swing of the bars 30 to give the proper vertical position to the fender.

In Fig. 7 a slight modification is shown in which the contact bar 14 connects with a hook member 33 that swings therewith, similar to the release bar described. The fender 8 is here provided with a release bar 34 that engages this hook 23. It will be understood that the operation is substantially the same, as the rearward movement of the contact bar will swing the hook backward and upward and release the fender to drop.

In Fig. 8 is shown a hook member 35 carried by the fender 8, and which hook has a spring plate 36 secured thereto and normally offset from the hook at the lower face opposite the release bar 21. This will prevent tripping of the release bar when the car is given a violent jolt, but will permit the tripping of the hook from the release bar when the contact bar is moved rearwardly by an obstruction.

It may sometimes be advisable to cause the fender to drop before it strikes an obstruction, which can be effected from the body of the car. A cord 37 is shown extended rearwardly from the contact bar 14 and when pulled will move the contact bar rearward and release the fender.

It will be observed that the contact bar 14 and the bumper 2 are curved rearward at their end portions.

In Fig. 5 is shown a modification in which the fender is composed of two parts 40 and 41, these being hinged at 42, and the guide bar 43 has its lower end 44 bent forward, to cause the lower part 41 of the fender to extend forward when dropped.

In the arrangement shown in Fig. 6 the arms that carry the contact bar and the release bar are secured to the bumper instead of turning thereon, but the bumper swings in the arms 31 to permit the said movement of the contact and release bars.

It will be understood that from the construction described that the operation of the parts is not dependent upon springs, but the release of the fender by swinging of the contact and release bars, permits it to drop by gravity, and its considerable weight will cause it to fall quickly to the ground. When the fender falls the attached contact and release bars are free to swing, and will assume a position to be engaged by the hook of the fender when it is raised. The contact and release bars will swing rearward when engaged by the hook to pass over the end of the hook, and then they will return by gravity to their former position and the contact bar will be engaged by the fender when the raising pressure is relieved. Such construction is comparatively simple and of light weight, at the same time is not likely to be injured by an obstruction, because the contact bar moves rearward until the object strikes the bumper, and the latter will receive the impact. At the same time, when an obstruction hits the contact bar to swing it rearward, the release bar will be slightly elevated in releasing the hook, and the fender will be also slightly raised. This will offer a slight resistance to the impact, and to a certain extent cushion the blow.

In Figs. 1 and 3, I show a cross bar that will engage an object that might be struck by the bumper and fall forward above the latter. A bar 45 is supported by rods 46 and 47 that are secured to the collars 1 and 1$^x$, on the bumper 2. Supports 48 and 49 extend from the cross bar 5 back to the car frame at the attachment of the arms 3 and 4. By this means the bar 45 is supported some distance above the bumper, and slightly to the rear thereof. If a person should be struck by the bumper this cross bar 45 would prevent him falling back in front of the radiator. Furthermore this cross bar protects the lamps of the car.

What I claim is:—

1. The combination of a bumper, a fender arranged to move vertically, means arranged to hold the fender normally in raised position, and a movable contact bar independent of the bumper and arranged to be engaged by an object struck and to be shifted thereby, the contact bar and fender being so arranged that the movement of the contact bar will effect the fall of the fender.

2. The combination with a vehicle frame, of a bumper carried by the frame, a fender arranged to move up and down below the bumper, a trip device arranged to hold the fender normally in raised position, and a contact bar positioned normally in front of the bumper to be engaged by an object struck and to be moved back thereby and permit the object to strike the bumper, the contact bar being connected with the said trip device whereby its rearward movement will release the fender.

3. The combination with a vehicle frame, of a bumper carried by the frame, a fender arranged to move up and down below the bumper, a trip device arranged to hold the fender normally in raised position, and a contact bar positioned normally in front of the bumper to be engaged by an object struck and to be moved back thereby and permit the object to strike the bumper, the contact bar being connected with the said trip device whereby its rearward movement will release the fender, said trip device being arranged to reëngage the fender when elevated, said contact bar being automatically returned to normal position when free from the object.

4. The combination with a vehicle frame, of a bumper carried by the frame, a fender arranged to move up and down below the bumper, a trip device arranged to hold the fender normally in raised position, and a contact bar positioned normally in front of the bumper to be engaged by an object struck and to be moved back thereby and permit the object to strike the bumper, the contact bar being connected with the said trip device whereby its rearward movement will release the fender to drop prior to engagement of the object with the bumper, said trip device being arranged to reëngage the fender when elevated, said contact bar being automatically returned to normal position when free from the object.

5. The combination with a vehicle frame, of a bumper carried thereby, a fender, guiding means for the up and down movement of the fender, a contact bar pivotally supported to swing rearwardly, a hook member on the fender, a movable latch member arranged to engage the hook and hold the fender raised to be released when the latch member is shifted, said contact bar being arranged to shift the latch member when moved rearward by engagement with an object to release the fender prior to the object engaging the bumper, said latch member being arranged to reëngage the fender when raised.

6. The combination with a vehicle frame, of a bumper, means for adjustably securing the bumper to the spring supports of the vehicle, a fender, a pair of guide members for the fender carried by said bumper to move up and down, a contact bar supported to swing, a trip bar secured to the contact bar, a hook member on the fender arranged to engage the trip bar to hold the fender raised, said contact bar being normally positioned in front of the fender to be swung rearward by an object struck and permit the object to engage the bumper, said trip bar being swung with the contact bar to release said hook to permit the fender to drop prior to engagement of the object with the bumper, said hook and trip bar being arranged to reëngage on raising the fender and thereby bring the contact bar to normal position.

7. The combination with a vehicle frame, of a bumper carried by the frame, a fender arranged to move up and down below the bumper, a trip device arranged to hold the fender normally in raised position, a contact bar positioned normally in front of the bumper to be engaged by an object struck and to be moved back thereby and permit the object to strike the bumper, the contact bar being connected with the said trip device whereby its rearward movement will release the fender, and an alarm operated by the fender when released by the trip device.

8. The combination with a vehicle frame, of a bumper, a fender arranged to move up and down, a trip device arranged to hold the fender normally in raised position, a contact member connected with the trip device to release the fender by engagement with an object struck, a flexible member connected with the fender to raise the same, said member being carried back to the vehicle, and signal means operated by the flexible member to be actuated when the fender is released by the trip device and drops.

9. The combination with a vehicle frame, of a bumper carried by the frame, a fender arranged to move up and down below the bumper, a trip device arranged to hold the fender normally in raised position, and a contact bar positioned normally in front of the bumper to be engaged by an object struck and to be moved back thereby and permit the object to strike the bumper, the contact bar being connected with the said trip device whereby its rearward movement will release the fender, said fender being guided to shift forward at the lower part to an inclined position when released to drop.

10. The combination with a vehicle frame, of a fender, a pair of upright guide members for the fender a contact bar supported to swing, a trip bar secured to the contact bar, a hook member on the fender arranged to engage the trip bar to hold the fender raised, said contact bar being normally positioned to be swung rearward by an object struck, said trip bar being swung with the contact bar to release said hook to permit the fender to drop, said hook and trip bar being arranged to reëngage on raising the fender and thereby bring the contact bar to normal position, the guide members being arranged to cause the fender to slant forward when dropped.

11. The combination with a vehicle frame, of a bumper carried by the frame, a fender arranged to move up and down below the bumper, a trip device arranged to hold the fender normally in raised position, and a contact bar positioned normally in front of the bumper to be engaged by an object struck and to be moved back thereby and permit the object to strike the bumper, the contact bar being connected with the said trip device whereby its rearward movement will release the fender, the fender having a hinged lower section, and means for swinging such section forward when dropped.

12. The combination with a vehicle frame, of a bumper, means for adjustably securing the bumper to the spring supports of the vehicle, a fender arranged to move up and down below the bumper, a trip device arranged to hold the fender normally in raised position, and a contact bar positioned normally in front of the bumper to be engaged by an object struck and to be moved back thereby and permit the object to strike the bumper, the contact bar being connected with the said trip device whereby its rearward movement will release the fender.

13. The combination with a vehicle frame, of a bumper, a pair of arms adjustably secured to the bumper for attachment to the spring supports of the vehicle, a fender, a pair of upright guide members for the fender carried by the bumper, a contact bar supported to swing on the bumper, a trip bar secured to the contact bar, a hook member on the fender arranged to engage the trip bar to hold the fender raised, said contact bar being normally positioned in front of the fender to be swung rearward by an object struck and permit the object to engage the bumper, said trip bar being swung with the contact bar to release said hook to permit the fender to drop prior to engagement of the object with the bumper, said hook and trip bar being arranged to reëngage on raising the fender and thereby bring the contact bar to normal position.

14. The combination with a vehicle frame, of a bumper, means for securing the bumper to the spring supports of the vehicle, a fender arranged to move up and down below the bumper, a trip device arranged to hold the fender normally in raised position, and a contact bar positioned normally in front of the bumper to be engaged by an object struck and to be moved back thereby and permit the object to strike the bumper, the contact bar being connected with the said trip device whereby its rearward movement will release the fender, the fender being slightly raised by the movement of the release bar to cause a resistance to the rearward movement of the contact bar.

15. The combination with a vehicle frame, of a bumper, arms for securing the bumper to the vehicle frame, a fender, a pair of upright guide members for the fender adjustably carried by the bumper, a contact bar supported to swing, a trip bar secured to the contact bar, a hook member on the fender arranged to engage the trip bar to hold the fender raised, said contact bar being normally positioned in front of the fender to be swung rearward by an object struck and permit the object to engage the bumper, said trip bar being swung with the contact bar to release said hook to permit the fender to drop, said hook and trip bar being arranged to reëngage on raising the fender and thereby bring the contact bar to normal position.

16. The combination with a vehicle frame, of a bumper carried thereby, a fender, guiding means for the up and down movement of the fender, a contact bar pivotally supported to swing rearwardly, a hook member, a movable latch member, a bar arranged to engage the hook, said hook and bar being connected with the fender and latch member whereby to hold the fender raised to be released when the latch member is shifted, said contact bar being arranged to shift the latch member when moved rearward by engagement with an object to release the fender, said latch member being arranged to reëngage the fender when raised.

17. The combination with a vehicle frame, of a bumper carried by the frame, a fender, a pair of upright guide members for the fender adjustably carried by the bumper, a trip device arranged to hold the fender normally in raised position, and a contact bar positioned normally in front of the bumper to be engaged by an object struck and to be moved back thereby and permit the object to strike the bumper, the contact bar being connected with the said trip device whereby its rearward movement will release the fender, said trip device being arranged to reëngage the fender when elevated, said contact bar being automatically returned to normal position when free from the object.

18. The combination with a vehicle frame, of a fender guided to move up and down, a trip device arranged to hold the fender normally in raised position, and a contact member positioned to be engaged by an object struck and to be moved back thereby, the contact member being connected with the said trip device whereby its rearward movement will release the fender, said fender having a hinged section guided to shift forward at the lower part to an inclined position when released to drop.

19. The combination with a vehicle frame, of a bumper carried by the frame, a fender arranged to move up and down below the bumper, a trip device arranged to hold the fender normally in raised position, and a contact bar positioned normally in front of the bumper to be engaged by an object struck and to be moved back thereby and permit the object to strike the bumper, the contact bar being connected with the said trip device whereby its rearward movement will release the fender, and a draft member extending back to the vehicle to swing the contact bar to release the fender.

20. In a device of the character set forth, the combination with a fender movable up and down, and a release bar arranged to swing back and forth, of a hook carried by the fender for engagement with the release bar, and a spring plate on the hook arranged to form a yielding contact between the hook and the bar.

21. The combination with a vehicle frame, and a bumper, of a pair of supports projecting upwardly from one part of the frame, a bar carried by said supports to extend transversely across some distance above the bumper, and additional supports extending down from said bar to another part of the frame.

Signed at New York city, N. Y., on May 24th, 1919.

EDGAR W. POHLIG.